Patented Apr. 1, 1930

1,752,721

UNITED STATES PATENT OFFICE

HAROLD E. BIERCE, OF LOS ANGELES, CALIFORNIA

METHOD OF PREPARING ADSORBENT MATERIALS

No Drawing.  Application filed May 9, 1928. Serial No. 276,516.

This invention relates to the preparation of adsorptive agents suitable for use in removing coloring matter or other impurities from liquids and particularly from hydrocarbon or other oils. The invention is directed more particularly to the production of such adsorptive agents by treatment of clay or earthy material with suitable reagents to increase the decolorizing or adsorptive efficiency thereof. Such methods of treatment are sometimes called "activation" although this term is strictly applied only to the treatment of clays or earthy materials having substantially no decolorizing or adsorptive properties in their natural state, whereas my method of treatment is applicable both to clays or earthy materials of this type and also to clays or earthy materials possessing varying degrees of adsorptive or decolorizing properties in their natural state.

In processes heretofore used or proposed for activating naturally ineffective clays or earthy materials or for increasing the efficiency of natural decolorizing or adsorbent earths it has been customary to use liquid mineral acids, such as sulphuric and hydrochloric acid, or aqueous solutions thereof, with or without subsequent washing of the material with water to remove therefrom the soluble salts produced by such treatment. Such processes involve several additional operations which would not ordinarily be used in the simple preparation of a naturally occuring decolorizing earth, so that the preparation of such acid treated clays is quite costly and imposes a material limitation on the use of the resulting product.

The main object of my invention is to provide a novel method for acid treatment of clay or earthy materials by the use of reagents other than those heretofore employed for the purpose and in such manner that the use of such reagents involves substantially no additional steps or operations other than those which would ordinarily be employed in the preparation of raw or untreated clay.

The invention comprises the use of solid organic acid agents instead of the liquid mineral acids heretofore employed. I have also found that particularly advantageous results may be obtained by treatment with such solid acid agents in a substantially dry process, that is, substantially in the absence of free or added water, other than such water as may be naturally contained or absorbed in the clay or earthy material or contained in the solid acid agent, for example water of crystallization.

I will now describe a preferred method of treatment according to my invention, using a solid organic acid as the activating agent. The clay or earth to be treated is first partially crushed or disintegrated to a size ranging from say ½ inch in diameter down to 200 mesh or finer. I may use, for example, a typical unclassified product of a suitable preliminary grinding or disintegrating machine. Such crushing operation may be substantially the same as the crushing operation to which raw clay is usually subjected prior to drying thereof. If the clay or earth contains a large amount of water it may, if desired, be partially dried, either before or after such crushing operation and before addition of the acid agent thereto, but should not be completely dried as it is necessary to have some moisture therein in order to cause the proper reaction between the acid agent and the clay. I have found that good results may be obtained, for example, by the use of clay containing from about 10% to 20% or more of absorbed moisture. The desired proportion of organic acid, such as for example, oxalic acid or formic acid, in solid or crystal form, is then added to the clay and thoroughly mixed therewith by some mechanical agitating means, such mixing operation being for example advantageously carried out in the drying apparatus hereinafter referred to. The mixing of the acid agent with the clay in this manner involves no additional step in the process, as such agent may simply be added between the preliminary crushing or disintegrating and the drying operation. As possible modifications of the process, the acid agent may be added to the clay before or during the crushing operation, or during the first part of the drying operation, the essential point being to add such acid agent while there is still sufficient moisture in the clay to effect the activation.

The mixture is then heated to a suitable temperature which is preferably sufficient to cause the solid organic acid to melt and to be carried both by its own fluidity and by solution in the water content of the clay, to all parts of the clay. Most solid organic acids which are found on the market may be easily melted at temperatures not exceeding 120° F. The temperature to which the material need be heated is therefore, lower than that ordinarily required to effect the desired degree of drying of the clay, so that here again no additional operation is introduced, the clay and added acid agent being simply heated to the usual temperature and in the usual manner required for drying, for example to 200°–250° F. or higher. During this heating the melted or dissolved acid reacts upon the clay in such manner as to increase the adsorptive or decolorizing efficiency thereof so that the activation is completed by the time the clay has been dried to the desired point. The drying and activation of the clay may be carried out in any suitable drying furnace or apparatus, preferably a furnace designed to cause agitation or movement of the material being heated, such as a rabbled hearth furnace, and it will be seen that the rabbling of the material in such a furnace will cause intimate mixture of the acid agent with the clay. When the drying is completed, the clay is pulverized to the proper fineness, for example, to about 95% minus 200 mesh, and is then ready for use. It is seen, therefore that no extraneous water or other liquid is added to the clay or earth and there is no necessity for washing the clay or for removing water or other liquid therefrom or doing any other operation which would not be done in the ordinary course of drying and grinding the raw clay for use as such.

The following tests indicate the increase in decolorizing efficiency resulting from the above treatment. In all the tests given below the same proportion of clay to oil was used in all tests given in the same tabulation. The raw clay used in these tests was a standard decolorizing clay from Utah and possessed in its natural state a decolorizing efficiency at least equal to that of the best grade of Florida fuller's earth. The raw clay before treatment averages about 16% moisture, while the treated and dried products all contained about 8% moisture. The oil used was a commercial grade of western lubricating oil and the decolorization was effected in each case by the usual method of agitating the oil with the raw or treated clay under standard conditions of temperature and time of treatment, and then filtering off the oil. The figure given in the "color" column is the height in inches of the column of oil required to obtain the same matched color in a Lovibond colorimeter.

Table No. I

| Clay | Color | Decolorizing efficiency in % |
|---|---|---|
| Raw standard Utah | 2.250 | 100 |
| Sample treated with 1% oxalic acid in crystals | 2.430 | 108 |
| Sample treated with 2.5% oxalic acid in crystals | 3.125 | 139 |
| Sample treated with 5% oxalic acid in crystals | 3.500 | 155 |

Tests were also made to determine the comparative effect of treatment with oxalic acid in solid form and in the form of aqueous solution, and the following table indicates that the treatment with such acid in solid form is much more beneficial.

Table No. II

| Clay | Color | Decolorizing efficiency in % |
|---|---|---|
| Sample of above raw clay treated with 2.5% oxalic acid in saturated aqueous solution | 2.690 | 100 |
| Sample of same clay treated with 2.5% oxalic acid in crystals | 3.125 | 116 |

In order to illustrate the advantage of this method of treatment over the previous methods, aside from the above-mentioned operating advantages, tests were also made showing the comparative decolorizing efficiency of clays treated with given proportions of sulphuric acid and of oxalic acid, another grade of western lubricating oil being used in these tests. The results of these tests are given in the following table.

Table No. III

| Clay | Color | Decolorizing efficiency in % |
|---|---|---|
| Sample of above raw clay treated with 5% 66° Bé. sulphuric acid | 2.187 | 100 |
| Same, treated with 10% 66° Bé. sulphuric acid | 2.375 | 108 |
| Same, treated with 12% 66° Bé. sulphuric acid | 2.375 | 108 |
| Same, treated with 3% oxalic acid in crystals | 2.812 | 128 |
| Same, treated with 5% oxalic acid in crystals | 3.125 | 143 |

I claim:

1. The method of treatment of earthy materials to increase the adsorptive properties thereof which comprises mixing an earthy material with solid oxalic acid and heating the mixture in the absence of added water to a sufficient temperature to cause reaction between said oxalic acid and said earthy material.

2. The method of treatment of earthy materials to increase the adsorptive properties thereof which comprises mixing an earthy material containing approximately 10% or more of absorbed moisture with solid oxalic acid, and heating the mixture in the absence of added water to a sufficient temperature to cause reaction of said oxalic acid with said earthy material, in the presence of the moisture content of the earthy material.

3. The method of treatment of earthy materials to increase the adsorptive properties thereof which comprises mixing a solid organic acid with an earthy material and heating the mixture in the absence of added water to a sufficient temperature to cause reaction between said organic acid and said earthy material.

In testimony whereof I have hereunto subscribed my name this 1st day of May, 1928.

HAROLD E. BIERCE.